United States Patent [19]
Kikuchi

[11] Patent Number: 5,333,224
[45] Date of Patent: Jul. 26, 1994

[54] PHOTOELECTRIC CONVERTER CONNECTING DEVICE

[75] Inventor: Kimihiro Kikuchi, Marumori, Japan

[73] Assignee: Alps Electric Co., Ltd., Tokyo, Japan

[21] Appl. No.: 79,669

[22] Filed: Jun. 18, 1993

[30] Foreign Application Priority Data

Jul. 6, 1992 [JP] Japan ................................ 4-201990

[51] Int. Cl.⁵ ............................ G02B 6/00; G02B 6/36
[52] U.S. Cl. ....................................................... 385/93
[58] Field of Search ................................... 385/88-93

[56] References Cited

U.S. PATENT DOCUMENTS

| | | | |
|---|---|---|---|
| 4,726,648 | 2/1988 | Haberland et al. | 385/93 |
| 4,790,618 | 12/1988 | Abe | 385/93 |
| 5,073,047 | 12/1991 | Suzuki et al. | 385/93 |
| 5,119,462 | 6/1992 | Matsubara et al. | 385/93 |
| 5,191,629 | 3/1993 | Kaiser | 385/93 X |

*Primary Examiner*—Akm E. Ullah
*Attorney, Agent, or Firm*—Guy W. Shoup; Patrick T. Bever

[57] ABSTRACT

A photoelectric converter connecting device including an elongated receptacle for receiving an optical converter unit and an optical fiber ferrule. The optical converter unit includes a lens holder, a lens fixedly connected to the lens holder by press molding, and a base including a photoelectric element. The photoelectric converter connecting device is assembled by heating and press molding the lens into the lens holder, then positioning and welding the base to hermetically seal the photoelectric element within the lens holder in a proper orientation with respect to the lens. The base is then welded to the elongated receptacle. Because the lens is press molded, the optical characteristics are more reliable than prior art index distribution type lenses.

11 Claims, 4 Drawing Sheets

PHOTOELECTRIC CONVERTER CONNECTING DEVICE

BACKGROUND OF THE INVENTION

1. Field of the Invention

The present invention relates to a photoelectric converter connecting device to be used for transmission or reception in optical communication using optical fibers.

2. Description of the Related Art

Index distribution type lenses or ball lenses have been used for photoelectric converter connecting devices for optical communication. In recent years, aspherical lenses have begun to be used for the improvement of coupling efficiency and the stabilization of lens performance in removing the spherical aberration of the above-mentioned lenses. Furthermore, for the improvement of lens handling, aspherical glass lenses being unified with lens-barrels in molding process can be found in the market. In FIG. 4, a conventional example is shown, and in the figure, 11 is a photoelectric converter, 12 is an elastic sleeve, 13 and 14 are holders, 15 and 16 are lens-barrels and 17 is an index distribution type lens. The index distribution type lens 17 is pressed into a lens-barrel or stuck to it with low melting point glass for the improvement of lens handling. The dispersion in optical characteristics of index distribution type lenses 17 is large, and the lens-barrel 15 and the lens-barrel 16 are fixed to each other with adhesive after the direction of the optical axis of the lens-barrel 15 is mechanically adjusted in sliding the lens-barrel for the end surface D of the lens-barrel to be abutted against the end surface of an optical fiber ferrule (not shown in a drawing) or after the confirmation and adjustment of optical characteristics in some manufacturing lots of the index distribution type lenses 17. The lens-barrel 16 and the holder 14 are fixed to each other by laser welding on a junction surface Y3. Next, the holder 14 and another holder 13 being incorporated with the elastic sleeve 12 are fixed to each other by laser welding on a junction surface Y4, and a receptacle 18 with a lens is completed. Further, the photoelectric converter 11 driven in a state where an optical fiber is inserted into the elastic sleeve 12 in a position abutting against the end surface D is incorporated into the holder 14, and the photoelectric converter 11 is adjusted being moved in the direction perpendicular to the optical axis in a state where it is abutted against the holder 14, and the photoelectric converter 11 and the holder 14 are fixed to each other on the junction surface Y5 by laser welding at a position where the optimum optical coupling efficiency can be obtained, and the optical system being composed of the optical fiber, the index distribution type lens 17 and the photoelectric converter 11 is maintained stably.

It may be possible to make some improvements partially in a conventional constitution; however, there has been a problem that the number of parts becomes large for the adjustment of the characteristic of an index distribution type lens and also that the mandays for fixing these parts become large.

SUMMARY OF THE INVENTION

The present invention is invented for the solution of the above-mentioned problem, and the object of the invention is to realize a photoelectric converter connecting device with a minimum number of parts and minimum mandays.

In order to achieve the above-mentioned object, the first invention offers a photoelectric converter connecting device having a constitution in which a lens holder, having an end surface to be abutted on an end surface of an optical fiber ferrule, and a lens are formed into a unity; a lens and a photoelectric converter element are unified to constitute a photoelectric converter by fixing a base mounted with a photoelectric element to a lens holder; and the above-mentioned photoelectric converter is inserted into and fixed to a holder serving also as a receptacle for holding the optical fiber ferrule and the lens in the lens holder to be coaxial.

The second invention offers a photoelectric converter connecting device having a constitution in which a lens holder, having an end surface to be abutted on an end surface of an optical fiber ferrule, and a lens are formed in a unity; a lens and a photoelectric element are unified to constitute a photoelectric converter by fixing a base mounted with a photoelectric element to a lens holder; an elastic sleeve for holding an optical fiber ferrule and a lens in the lens holder to be coaxial is fixed to the outer peripheral surface of the lens holder; and the above-mentioned photoelectric converter is inserted into and fixed to a holder serving also as a receptacle for holding the optical fiber ferrule on the outside of the elastic sleeve.

In the case of a lens in the present application, according to the first invention, when a lens material is formed into a predetermined lens shape by press molding, the lens holder is used as an outside mold, and the lens and the lens holder can be unified by making the outer surface of the lens be stuck fast to the inner surface of the lens holder with the pressure of a press, which improves the handling efficiency of a glass lens. The lens and a photoelectric converter element are unified to constitute a photoelectric converter, and the photoelectric converter is inserted into and fixed to a holder serving also as a receptacle for holding an optical fiber ferrule and a lens holder; thus, a photoelectric converter connecting device is constituted, which makes it possible to decrease the number of parts and to simplify assembling work.

According to the second invention, a photoelectric converter is constituted in unifying a photoelectric converter element and a lens which is formed being unified with a lens holder, and a photoelectric converter connecting device can be constituted in making the above-mentioned photoelectric converter be inserted into and fixed fast to a holder serving also as a receptacle for holding an optical fiber ferrule on the outside of the elastic sleeve, which makes it possible to decrease the number of parts and also to simplify assembling work.

DETAILED DESCRIPTION OF THE PREFERRED EMBODIMENTS

The first embodiment according to the present invention will be explained based on the drawings in the following.

Figure 1:
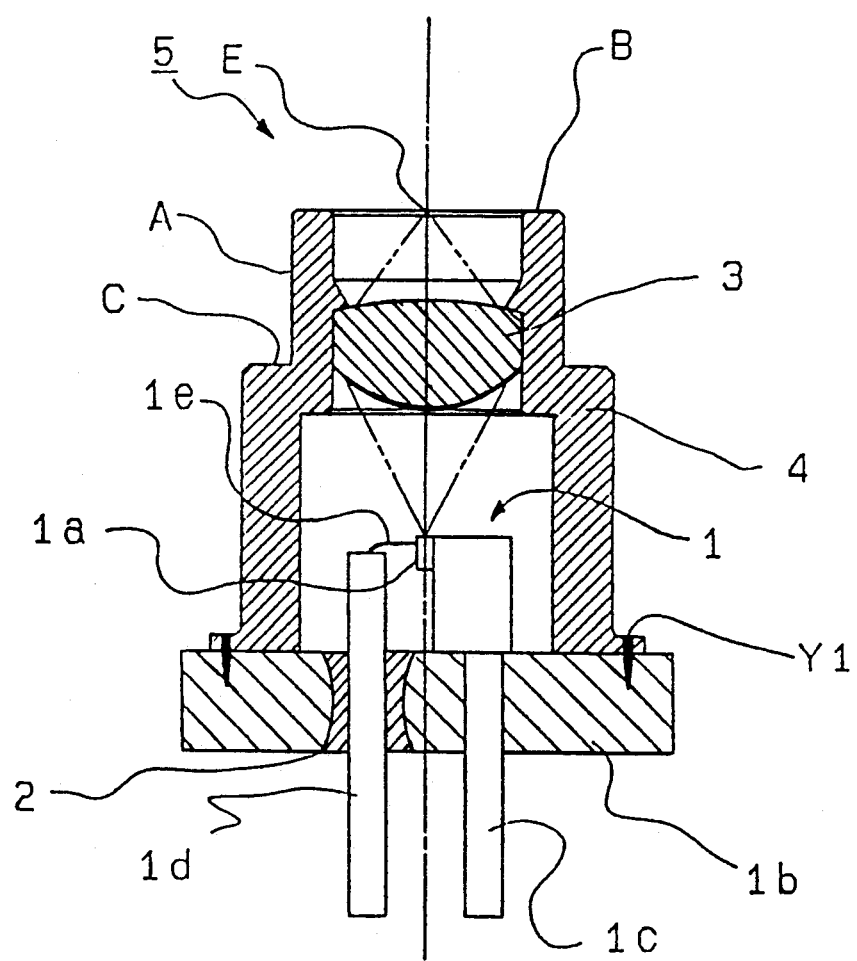
FIG. 1 is a cross sectional view of a photoelectric converter with a lens showing an embodiment according to the present invention.

FIG. 1 is a cross sectional view of the first embodiment according to the present invention showing a connecting device for emitting light having a laser diode conforming to FDDI standard as a photoelectric converter element.

A reference numeral 1 is a photoelectric converter element having a laser diode 1a as a light source and it is fixed to an electricity supplying means 1c being unified with a base 1b, and electric power is supplied from an electricity supplying means 1d, fixed to the base 1b through an insulator 2, through a bonding wire 1e. A photoelectric converter 5 is constituted with the above-mentioned parts being hermetically sealed with the base 1b, the lens 3 and the lens holder 4.

The lens holder 4 is made of a material containing Fe as a main constituent such as stainless steel or of a material containing Ni as a main constituent, and Au plating is given, if necessary. The outer peripheral surface A of the upper part of the lens holder 4 is finished with high precision of the order of several $\mu$m to be the same diameter as that of the outer peripheral surface of the optical fiber ferrule (not shown in a drawing), and the end surface B to be abutted on the end surface of the optical fiber ferrule and the abutting surface C to be abutted on the holder 6 (refer to FIG. 2) serving also as the receptacle for holding the optical fiber ferrule and the lens holder 4 are provided beforehand.

The lens 3 is manufactured as described in the following: a lens material is inserted into the lens holder 4 and the lens is formed by heating and press-molding the material and further coating for preventing reflection, etc. are given. After that, the lens holder 4 is fixed to a jig (not shown in a drawing) on the basis of the end surface B to be abutted on the end surface of the optical fiber ferrule of the lens holder 4; the base 1b of the photoelectric converter element 1 is stuck fast to the lens holder 4 in an inert gas atmosphere; the laser diode 1a is driven to be energized through electricity supply means 1c and 1d; the optical fiber is placed on an optical coupling point E and in that state the base 1b is slided in the direction perpendicular to the optical axis to make the optical coupling be in a proper state; and the welding portion Y1 is fixed by laser welding; thus, the optical converter 5 with a lens of which the optical axis alignment is finished is completed as shown in FIG. 1.

Figure 2:
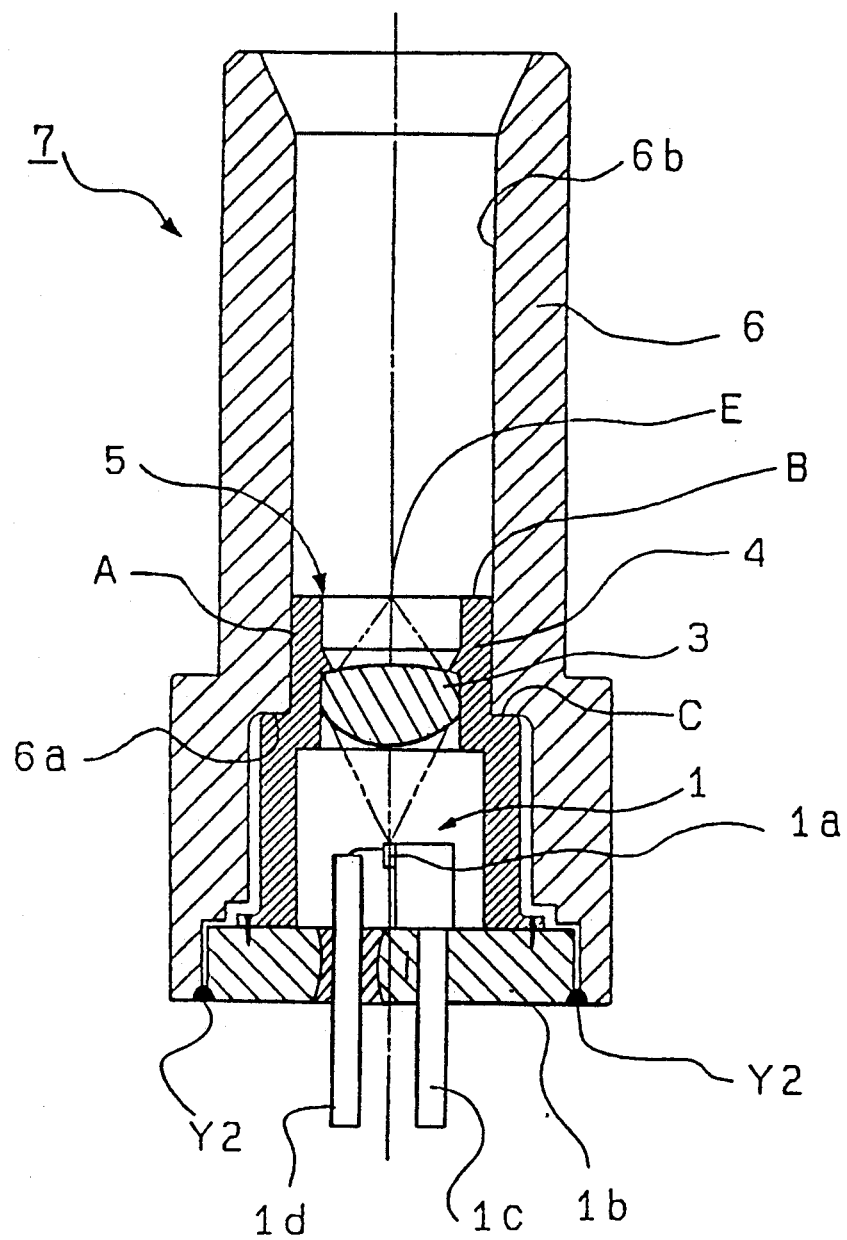
FIG. 2 is a cross sectional view of a photoelectric converter connecting device showing a first embodiment in which a photoelectric converter with a lens is incorporated.

Next as shown in FIG. 2, the optical converter 5 is inserted into the holder 6 serving also as the receptacle for holding the optical fiber ferrule, and the conjunction portion Y2 of the holder 6 and the base 1b is fixed by laser welding to complete a photoelectric converter connecting device 7. The inner diameter 6b of the holder 6 is arranged in advance to be a little larger than the diameter of the optical fiber ferrule with an error less than 10 $\mu$m as a guide hole for holding the optical fiber ferrule and the outer peripheral surface A of the lens holder 4. A step portion 6a is provided to be abutted against the abutting surface C of the lens holder 4 for the positioning and fixing of the photoelectric converter 5. In general, the holder 6 is made of stainless steel, but the material is not limited to this, and it is possible to make the holder 6 of plastic, etc. for manufacturing it by press-engagement. The guide connection method of this type is called a precision sleeve system and the manufacturing cost of a device by this method can be cheaper in comparison with that by a method using an elastic sleeve.

Figure 3:
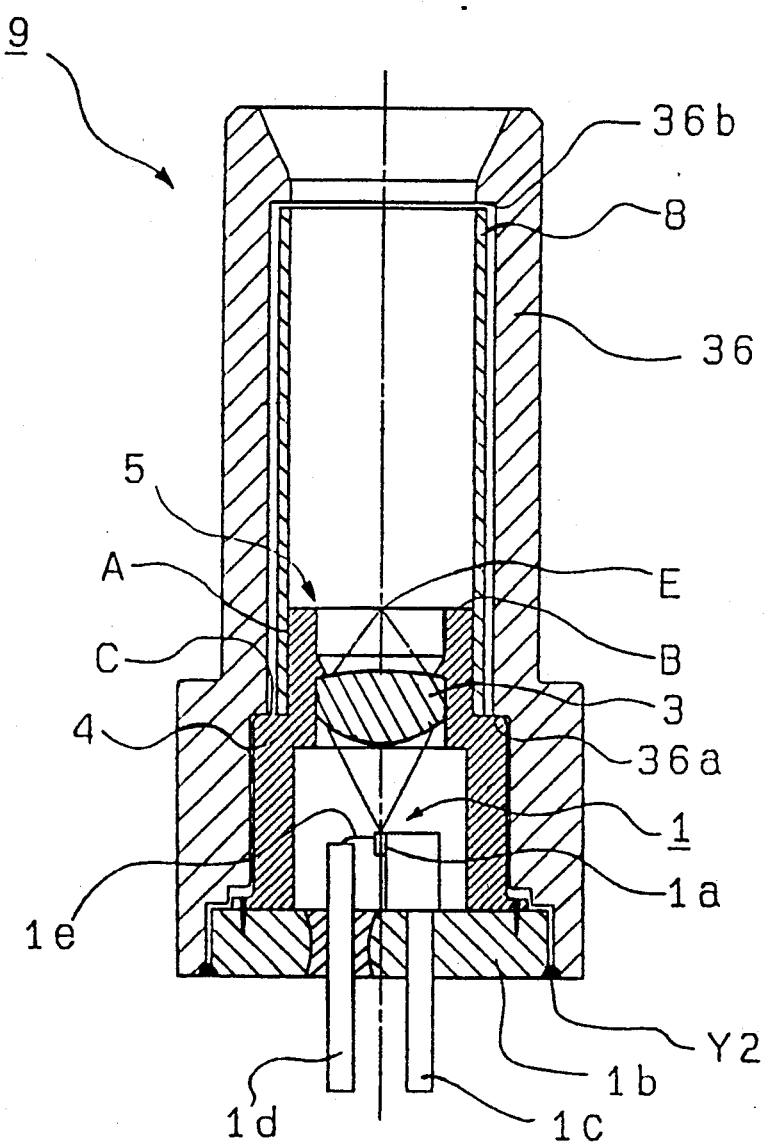
FIG. 3 is a cross sectional view of a photoelectric converter connecting device showing a second embodiment in which a photoelectric converter with a lens is incorporated.
Figure 4:
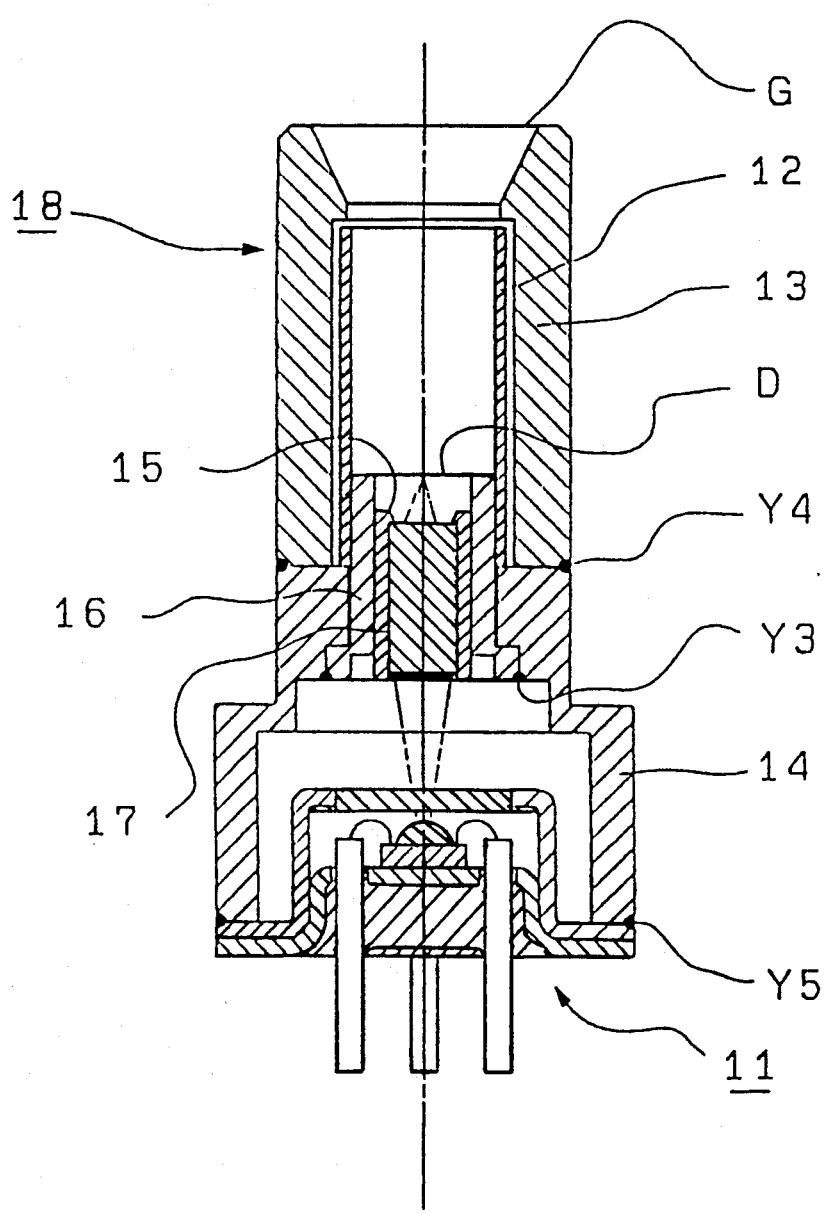
FIG. 4 is a cross sectional view of a conventional photoelectric converter connecting device.

Further, a second embodiment will be explained based on FIG. 3.

In the case of a holder 36 in the second embodiment, the inner diameter of the holder 36 serving also as the receptacle for holding the optical fiber ferrule described in the first embodiment is finished to be larger than the outer diameter of the elastic sleeve 8, and there are provided a stopper 36b in the direction of drawing out the optical fiber ferrule of the elastic sleeve 8 and a step portion 36a for abutting on the abutting surface C of the lens holder 4 for positioning the photoelectric converter 5. The elastic sleeve 8 is fixed on the outer peripheral surface A of the lens holder 4 of the photoelectric converter 5 explained in the first embodiment and it is inserted into the holder 36, and the junction portion Y2 of the holder 36 and the base 1b is fixed by laser welding to complete the photoelectric converter connecting device 9. In general, the holder 36 is made of stainless steel but the material is not limited to it, and it is also possible to make the holder 36 of plastic, etc. in forming it by press-engagement. The guide-connection method of this type is called an elastic sleeve system, and the manufacturing cost by this method is a little higher in comparison with that by a precision sleeve system in which an elastic sleeve is not used; however, there are merits that stable coupling and connection characteristics can be obtained and smooth insertion can be maintained even when small foreign materials such as dust, etc. are attached.

In the present invention, an example to be used for a multimode optical fiber conforming to FDDI standard is described; however, the present invention is not limited to this; it can be applied to a single mode optical fiber and to any optical system having any kind of connecting mechanism such as SC type or FC type having connector stoppers of different constitutions.

A photoelectric converter connecting device according to the first invention as described in the above is constituted with a photoelectric converter having a unified constitution of a lens and a photoelectric converter element, and a holder serving also as a receptacle for holding an optical fiber ferrule and a photoelectric converter; thereby, the number of parts and the number of fixing portions of them can be decreased and also the cost of parts and the mandays for assembling work can be remarkably decreased. Furthermore, higher performance can be obtained such as the incorporation of an aspherical lens into a lens unit.

A photoelectric converter connecting device according to the second invention is constituted with a photoelectric converter having a unified constitution of a lens and a photoelectric converter element, an elastic sleeve for holding an optical fiber ferrule and a lens coaxially, and a holder serving also as a receptacle; thereby, the number of parts and the number of fixing portions of them are decreased, which makes it possible to remarkably decrease the cost of parts and the mandays for assembling work. Furthermore, the device performance can be upgraded in incorporating an aspherical lens to a lens unit.

We claim:

1. A photoelectric converter connecting device comprising:

a receptacle defining a cylindrical passage for receiving an optical fiber ferrule; and a photoelectric converter including a lens press molded into a lens holder, the lens having a common axis with the cylindrical passage, said photoelectric converter also including a photoelectric converter element mounted to a base, the base being mounted to said lens holder and to said receptacle such that an end surface of said lens holder is abutted on an end surface of the optical fiber ferrule.

2. A photoelectric converter connecting device according to claim 1 wherein said base and said lens holder are welded to each other and the photoelectric converter and said receptacle are welded to each other.

3. A photoelectric converter connecting device according to claim 1 wherein said base and said lens holder are welded to each other and the photoelectric converter and said receptacle are welded to each other.

4. A photoelectric converter connecting device comprising:

a receptacle defining a cylindrical passage;

an elastic sleeve, for holding an optical fiber ferrule, located inside the cylindrical passage; and a photoelectric converter the receptacle, said photoelectric converter being composed of: a lens press molded into a lens holder, the lens holder having an end surface abutted on an end surface of an optical fiber ferrule; and a photoelectric converter element being fixedly connected to a base, the base being mounted to the lens holder.

5. A photoelectric converter connecting device according to claim 4 wherein said lens holder includes an outer peripheral surface adjacent the end surface which is sized to fit within the elastic sleeve for holding the optical fiber ferrule.

6. A photoelectric converter connecting device according to claim 4 wherein said photoelectric converter is constituted by welding said base and said lens holder to each other, and the photoelectric converter and said receptacle are welded to each other.

7. A photoelectric converter connecting device according to claim 2 wherein said base and said lens holder are welded to each other and the photoelectric converter and said receptacle are welded to each other.

8. A photoelectric converter connecting device according to claim 5 wherein said photoelectric converter is constituted by welding said base and said lens holder to each other, and the photoelectric converter and said receptacle are welded to each other.

9. A photoelectric converter connecting device comprising:

an elongated receptacle defining a first cavity therethrough; and an optical converter unit received in the cavity, the optical converter unit including:

a lens holder defining a second cavity therethrough;

a lens located inside the second cavity and fixedly connected to the lens holder by press molding; and a flat base fixedly connected over one end of the lens holder, the base also being fixedly connected to the elongated receptacle.

10. A photoelectric converter connecting device according to claim 9 further comprising an optical converter element fixedly connected to the base and positioned such that the optical converter element coincides with a focal point of the lens.

11. A photoelectric converter connecting device according to claim 9, wherein the base is welded to the lens holder, and the base is welded to the receptacle.

* * * * *